Patented Nov. 22, 1938

2,137,498

UNITED STATES PATENT OFFICE 2,137,498

DISAZO DYESTUFFS AND PROCESS FOR THEIR MANUFACTURE

Henry Mirocourt, Sotteville-les-Rouen, and Marcel Georges Jirou, Rouen, France, assignors to Compagnie Nationale de Matières Colorantes et Manufactures de Produits Chimiques du Nord Réunies Etablissements Kuhlmann, Paris, France, a corporation of France No Drawing. Application June 22, 1937, Serial No. 149,726. In France June 30, 1936

5 Claims. (Cl. 260—161)

The present invention has for subject disazo-dyestuffs obtained by successive coupling of one molecule of a tetrazo compound of general formula

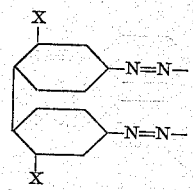

in which the X's represent a halogen, an alkyl, or an alkoxy group with one molecule of a naphthol sulphonic acid and with one molecule of a sulphonated aryl pyrazolone.

These dyestuffs which correspond to the general formula:

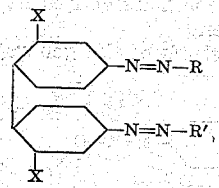

in which X has the same significance as above, while R represents the naphthol sulphonic coupling component and R' the pyrazolonic coupling component, are of great value for the dyeing of wool and silk. They dye wool in an acid bath and silk in a neutral bath shades from orange to scarlet. These shades are distinguished by their good fastness in general and particularly to light. The dyeings may readily be discharged and the whites obtained are particularly stable to light.

In the preparation of these dyestuffs either the tetrazo compound may be coupled in the first place with the naphthol sulphonic acid and then the intermediate product thus obtained be coupled with the sulphonated aryl pyrazolone, or on the contrary in the first place the tetrazo compound may be coupled with the pyrazolone derivative to form the intermediate and this intermediate be coupled with the naphthol sulphonic coupling component. The new dyestuffs obtained possess dyeing properties different from those of the dyestuffs having analogous general formula and which are derived from aminonaphtholsulfonic acids; the new dyestuffs possess better brightness of shade when dyed on wool.

In all cases as naphthol sulphonic acid any α- or β- napthol mono- or di- sulphonic acids may be employed.

Likewise a sulphonated aryl pyrazolone may be employed substituted by halogens or radicals like $NO_2$, $CH_3$, $C_2H_5$, $OCH_3$, $OC_2H_5$, COOH, $COOC_2H_5$ a. s. o.

The invention is illustrated in the following non-limiting examples.

Example 1

21.2 kgs. of 2.2'-dimethyl-4.4'-diaminodiphenyl is tetrazotized with 70 kgs. of hydrochloric acid and 14 kgs. of sodium nitrite.

In the diazo solution cooled to 0° C. there is rapidly incorporated a solution of 50 kgs. of sodium carbonate in 250 litres of water cooled to 0° C. In the mixture which is vigorously agitated there is poured in two minutes a solution of 34.8 kgs. of the disodium salt of 2-naphthol-6.8-disulphonic acid in 300 litres of water at a temperature of 10° C.

The formation of the intermediate is attained in a quarter of an hour, and then into this there is poured a solution, rendered slightly alkaline, of 30 kgs. of 1-(2'-chloro-5'-sulphophenyl)-3-methyl-5-pyrazolone in 500 litres of water.

The dyestuff forms rapidly. Isolated by salting at the time of its formation and dried it exhibits the form of a brick red powder readily soluble in water, even in the cold. It dissolves in concentrated sulphuric acid with a red-yellowish colour.

It dyes wool in an acid bath orange red shades of good fastness. Likewise it dyes natural silk in an acid bath, and not quite so well in a neutral bath.

Example 2

If in the foregoing example the 2-naphthol-6.8-disulphonic acid is replaced by 24.4 kgs. of the sodium salt of 1-naphthol-4-sulphonic acid, the quantity of 1-(2'-chloro-5'-suphophenyl)-3-methyl-5-pyrazolone remaining the same, a dyestuff is obtained which after separation and drying exhibits the form of a red powder readily soluble in water with red orange colour and in concentrated sulphuric acid with a dirty violet.

This dyestuff dyes wool in an acid bath scarlet shades of very good fastness. It dyes natural silk both in an acid bath and in a neutral bath; the dyeings have good fastness and may be discharged to a pure white.

Example 3

25.3 kgs. of 2.2'-dichloro-4.4'-diaminodiphenyl are tetrazotized in the usual manner. To the diazo solution rendered alkaline there is rapidly added a solution of 24.4 kgs. of the sodium salt of the 1-naphthol-4-sulphonic acid, then when the intermediary combination is achieved (which takes place at the end of a short time) into it is poured a slightly alkaline solution of 30 kgs. of 2-(2'-chloro-5'-sulphophenyl)-3-methyl-5-pyrazolone.

The dyestuff when isolated is a red-brown powder which dissolves in cold water with a vivid orange colour and in sulphuric acid with a dull red.

It dyes wool in an acid bath strong orange shades having good fastness, particularly to light.

It dyes natural silk both in an acid bath and in a neutral bath orange shades of fastness equivalent to that of the shades upon wool.

The dyeings may be discharged to a pure white stable to light.

*Example 4*

25.3 kgs. of 2.2'-dichloro-4.4'-diaminodiphenyl are tetrazotized in the usual manner with 70 kgs. of hydrochloric acid and 14 kgs. of sodium nitrite. Into the diazo solution having a volume of 2,000 litres at a temperature of 5° C. there is poured in a period of an hour, a solution of 32 kgs. of 1-(2'-chloro-5'-sulphophenyl)-3-methyl-5-pyrazolone dissolved in 1200 litres of water at 25° C. with the necessary quantity of dilute caustic soda, then the solution is brought to a slightly violet reaction with hydrochloric acid upon Congo red paper.

At the end of an hour or two coupling is achieved.

The insoluble intermediate being a clear yellow precipitate is filtered and then emulsified with cold water to a volume of 1000 litres at a temperature of 10° C. Into it there is then poured a solution of 24.4 kgs. of the sodium salt of the 1-naphthol-4-sulphonic acid.

The coupling is very rapid and the whole enters into solution.

The dyestuff isolated by means of common salt is filtered and dried. It has all the qualities described for the dyestuff obtained according to Example 3. Its shade, however, is much more bright.

The invention is obviously not limited to the manufacture of the dyestuffs described in the above examples. Thus one may also utilize as diazotizable base 2.2'-dimethoxy-4.4'-diaminodiphenyl and 2.2'-diethoxy-4.4'-diaminodiphenyl.

Instead of the naphthol sulphonic acids indicated there may also be used β-naphthol-monosulphonic acids 2.6, 2.7 and 2.8 and 2-naphthol-5.7-disulphonic and 1-naphthol-3.6-disulphonic acids.

In the same way instead of 1-(2'-chloro-5'-sulphophenyl)-3-methyl-5-pyrazolone other pyrazolones may be used, such for example as:

1-(4'-methyl-2'-sulphophenyl)-3-methyl-5-pyrazolone.

1-(2'-chloro-4'-sulphophenyl)-3-methyl-5-pyrazolone.

1-(4'-chloro-2'-sulphophenyl)-3-methyl-5-pyrazolone.

1-(2'-5'-dichloro-4'-sulphophenyl)-3-methyl-5-pyrazolone.

The ethyl ester of 1-(2'-chloro-5'-sulphophenyl)-5-pyrazolone-3-carboxylic acid.

1-(2'-5'-dichloro-4-sulphophenyl)-5-pyrazolone-3-carboxylic acid.

What we claim is:—

1. A process for the preparation of disazodyestuffs consisting in combining a tetrazo compound of the general formula:

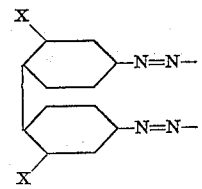

in which the X's represent members of the class consisting of the halogens, the alkyl and alkoxy groups, successively with a molecule of a naphthol sulphonic acid having no substituent other than the hydroxy and sulpho groups and with a molecule of a 5 pyrazolone having a 3 group taken from the class consisting of the methyl, carboxy, and carboxy ester groups and a 1 sulphophenyl group having a substituent of the class consisting of the methyl and chloro atoms.

2. A process for the preparation of disazodyestuffs consisting in combining a tetrazo compound of the general formula:

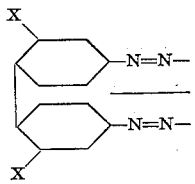

in which the X's represent members of the class consisting of the halogens, the alkyl and alkoxy groups, in the first place with a molecule of a 5 pyrazolone having a 3 group taken from the class consisting of the methyl, carboxy and carboxy ester groups, and a 1 sulphophenyl group having a substituent of the class consisting of the methyl and chloro atoms.

3. Disazodyestuffs of the general formula:

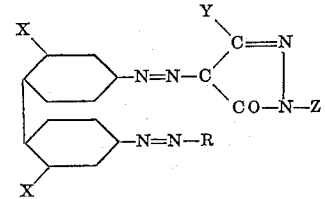

in which the X's represent members of the class consisting of the halogens, the alkyl and alkoxy groups, "R" stands for a naphthol sulphonic acid having no substituent other than the hydroxy and sulpho groups, "Y" stands for a member of the group consisting of the methyl, the carboxy and the carboxy ester groups and "Z" is a sulphophenyl group having a substituent of the class consisting of the methyl and chloro atoms.

4. Disazodyestuffs of the general formula:

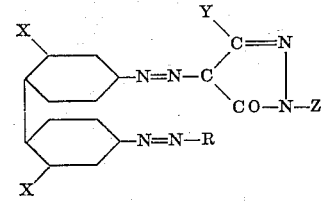

in which the X's represent members of the class consisting of the halogens, the alkyl and alkoxy groups, "R" stands for a naphthol monosulphonic acid having no substituent other than the hydroxy and sulpho groups, "Y" stands for a member of the group consisting of the methyl, the carboxy and the carboxy ester groups and "Z" is a sulphophenyl group having a substituent of the class consisting of the methyl and chloro atoms.

5. Disazodyestuffs of the general formula:

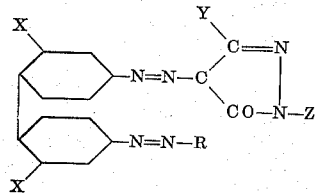

in which the X's represent members of the class consisting of the halogens, the alkyl and alkoxy groups, "R" stands for a naphthol disulphonic acid having no substituent other than the hydroxy and sulpho groups, "Y" stands for a member of the group consisting of the methyl, the carboxy and the carboxy ester groups and "Z" is a sulphophenyl group having a substituent of the class consisting of the methyl and chloro atoms.

HENRY MIROCOURT.
MARCEL GEORGES JIROU.